July 13, 1954   C. D. RICE   2,683,561
CONTAINER ADAPTED FOR FOOD PRODUCTS
Filed Nov. 10, 1950   2 Sheets-Sheet 2

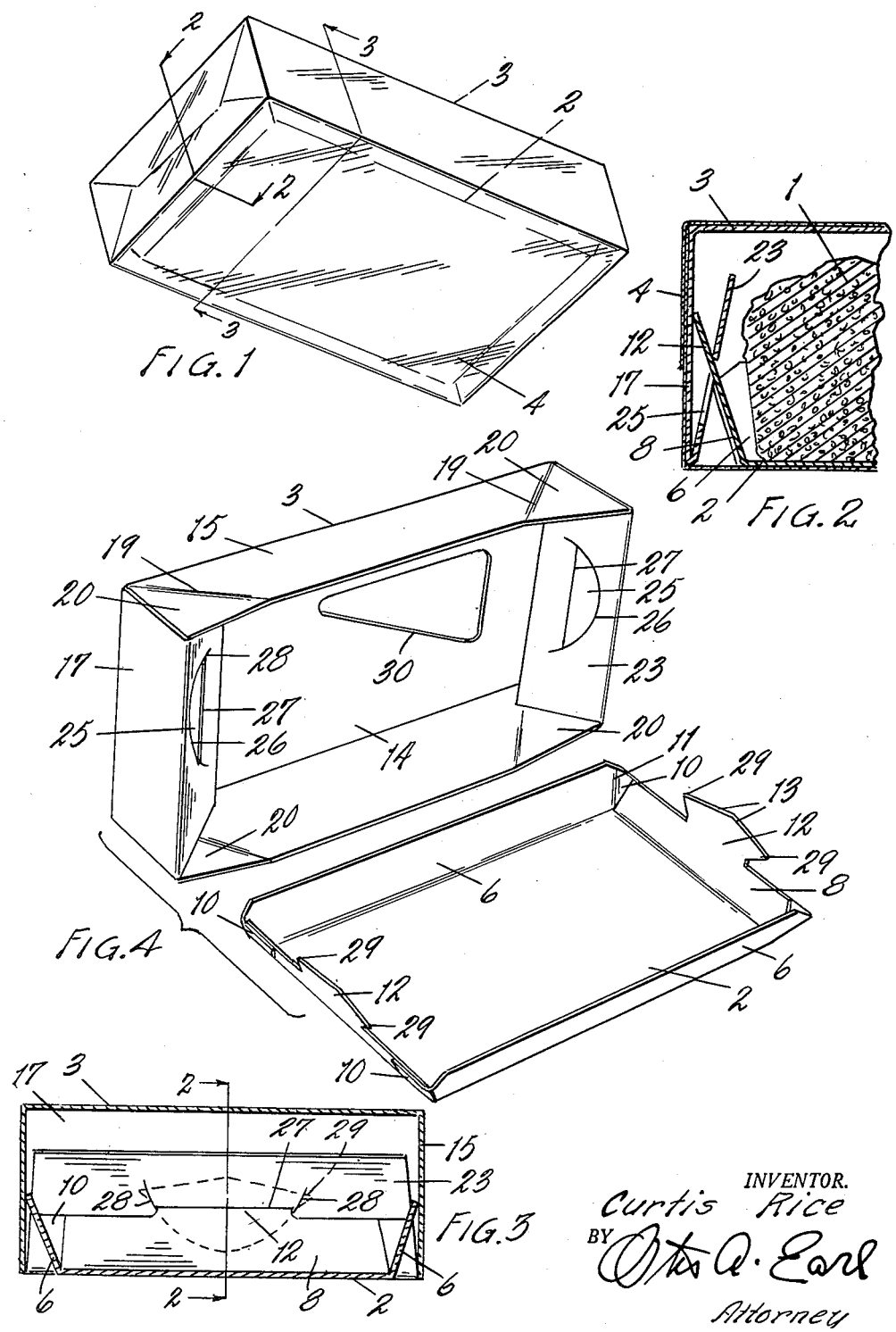

INVENTOR.
Curtis Rice
BY
Otis A. Earl
Attorney

Patented July 13, 1954

2,683,561

UNITED STATES PATENT OFFICE 2,683,561

CONTAINER ADAPTED FOR FOOD PRODUCTS

Curtis D. Rice, Kalamazoo, Mich., assignor to Sutherland Paper Company, Kalamazoo, Mich.

Application November 10, 1950, Serial No. 195,040

7 Claims. (Cl. 229—23)

This invention relates to improvements in containers adapted for food products.

The main objects of this invention are:

First, to provide a container which includes a body member adapted as a baking dish and a cover which may be applied thereto for delivery of the baked or partially baked food or food material that is prepared for baking.

Second, to provide a covered container including a dish suitable for baking in which the cover may be quickly and easily applied after baking the contents for delivery to the customer, and removed for further baking or warming of the contents of the baking dish and re-applied as a protection for the product as may be desired.

Further objects relating to details and economies of the invention will appear from the description to follow. The invention is defined and pointed out in the claims.

A preferred embodiment of the invention is illustrated in the accompanying drawing, in which:

Fig. 1 is a bottom perspective view of a wrapped container embodying my invention.

Fig. 2 is an enlarged fragmentary section on a line corresponding to line 2—2 of Fig. 1.

Fig. 3 is a transverse section on a line corresponding to line 3—3 of Fig. 1 with the outer wrapping omitted.

Fig. 4 is a perspective view of the tray-like body member and the cover before assembling.

Figure 5:
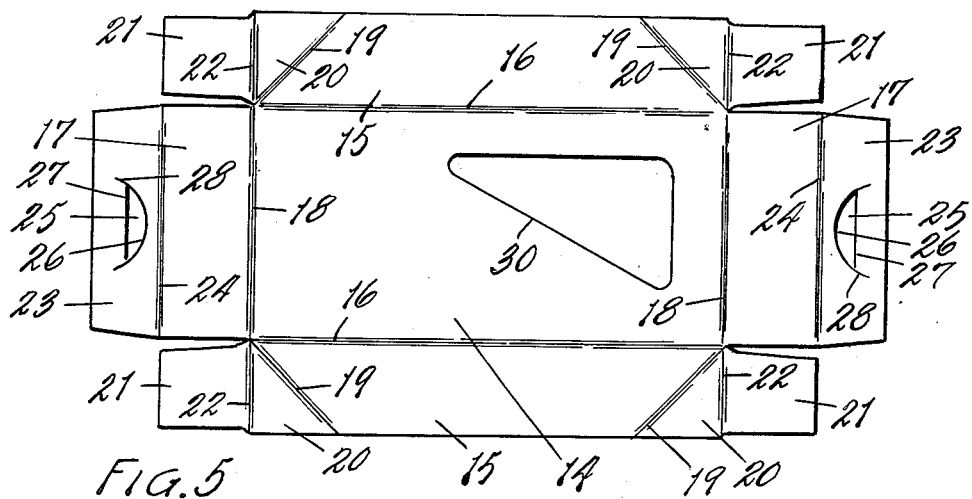
Fig. 5 is a plan view of the cover blank.

The embodiment of my invention illustrated is especially designed to provide a container which may be used by bakers or other merchandisers for the preparation of food baked or partially baked or prepared for baking and the packaging thereof for delivery to the customer, permitting the customer to bake or complete the baking or warm the contents, such for example, as rolls, indicated at 1 in Fig. 2.

The embodiment of my invention illustrated comprises a tray or dish-like body member 2 and a cover 3 which may be inverted over the body member and retainingly engaged therewith as is shown in Figs. 2 and 3. After the cover is applied, the assembled cover and body member are desirably enclosed by a wrapper 4 preferably of heat sealable transparent wrapping material, such for example, as Pliofilm. The body member 2 comprises a bottom 5, side walls 6—6 hingedly connected thereto at 7—7, end walls 8 hingedly connected to the bottom at 9—9, the hinging connections being desirably in the form of scores. The side walls are provided with corner flaps 10 connected thereto by the hinging connections 11, the corner members being adhesively secured to the outer sides of the end walls. These connections are made so that the side and end walls are outwardly inclined as is best illustrated in Figs. 2, 3 and 4. The end walls are provided with projecting dove-tailed tongues 12 having tapered ends 13. The bottom member is formed of an integral blank of greaseproof or grease resistant material and may, for example, be formed of suitable container stock having glassine paper laminated thereto provide a greaseproof lining. I have not illustrated that in the accompanying drawing as it forms no part of my present invention.

Figure 6:
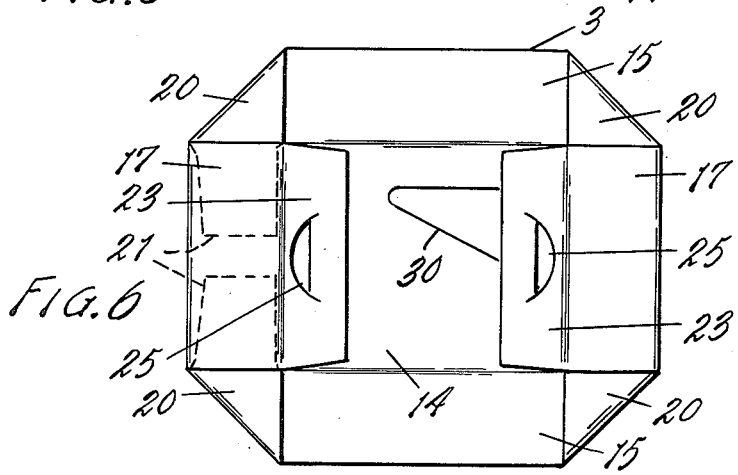
Fig. 6 is a plan view of the cover in collapsed form.
Figure 7:
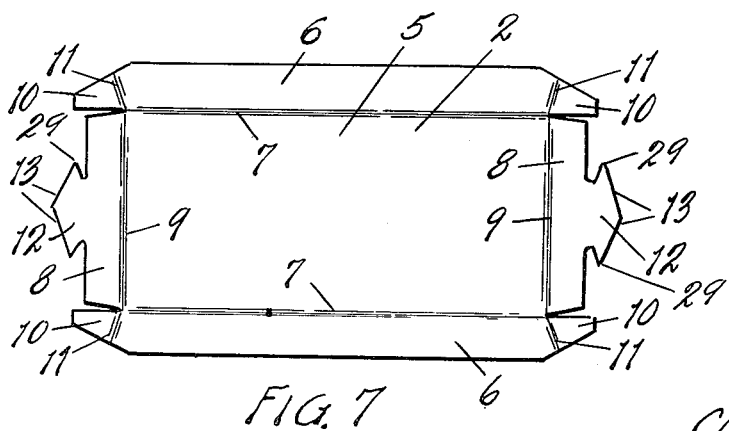
Fig. 7 is a plan view of the blank from which the body member of the container is formed.

The cover 3 is formed of an integral blank as is illustrated in Fig. 5 and comprises a top 14 having side walls 15 hingedly connected at 16 and end walls 17 hingedly connected thereto at 18. The side walls have diagonal scores 19 at their ends providing hinging flaps 20. These hinging flaps have corner extensions 21 hingedly connected thereto at 22 and adhesively secured to the end members so that the cover may be collapsed as shown in Fig. 6 and quickly erected by pulling upwardly on the end walls. The end walls are provided with locking extensions 23 which are hingedly and springably connected thereto at 24, the hinging connections being such that the locking extensions tend to spring back after they are turned inwardly to the position shown in Fig. 2. The locking extensions are provided with slots 25 adapted to receive the tongues 13 when the cover is erected and passed over the body member. The slots 25 desirably have curved edges 26 and straight edges 27, slits 28 being extended beyond the edges 15 to receive the tips 29 of the dove-tails of the tongues 12.

Before the cover is applied, the extensions 23 are swung inwardly and as the cover is passed over the body member, the outwardly inclined tongues 12 pass through the slots 25 and interlock with the ends of the slots, the slits 28 facilitating such engagement and the locking retaining engagement of the parts. The cover is substantially longer than the body member so that fingers may be inserted between the end walls of the body member and the locking flaps from the under side of the cover to disengage the locking flaps. The cover is desirably provided with a window opening 30 through which the contents may be viewed. This window opening is closed by the wrapper 4 which is desirably of transparent material. The wrapper not only closes the window, but it closes the spaces between the body member and the cover.

The embodiment of my invention illustrated is especially designed for use in preparing and merchandising food products which may be baked or partially baked or prepared for baking. If fully baked, it is frequently desired to warm the product and the wrapper may be removed, the cover released, and the body member used for the baking or warming process. The product may be left in the body member if not entirely consumed and the cover re-applied to protect it, or sometimes it is desired only to heat or bake a portion of the contents and parts thereof may be removed if desired.

I have illustrated my invention in a highly practical embodiment thereof. I have not attempted to illustrate other embodiments and adaptations as it is believed that this disclosure will enable those skilled in the art to embody or adapt my invention as may be desired.

Having thus described my invention, what I claim as new and desire to secure by Letters Patent is:

1. In a container, the combination with a tray-like body member adapted as a baking dish and having a bottom and side and end walls, the side and end walls extending upwardly and outwardly from the bottom, the end walls having projecting tapered dove-tailed tongues on their upper edges, and a collapsible cover comprising a top and side and end walls hingedly connected thereto, the side walls having diagonal scores at their ends providing hinged folding flaps, said folding flaps having corner members hingedly connected thereto and secured to the end walls, the cover end walls having locking extensions springably connected to their outer edges and disposed inwardly of the cover end walls and inclined relative thereto, said extensions having slots therein through which said tongues are inserted, the lower edges of the slots being curved to facilitate the engagement of the tongues therewith when the cover is inverted over the body member, the said locking extensions being slit at the ends of their slots to receive the dove-tailed tongue projections, the cover being of such length relative to the body member as to permit fingers being inserted between the ends of the cover and the body member to facilitate disengagement of the cover locking extensions from the tongues.

2. In a container, the combination with a tray-like body member adapted as a baking dish and having a bottom and side and end walls, the side and end walls extending upwardly and outwardly from the bottom, the end walls having projecting dove-tailed tongues on their upper edges, and a collapsible cover comprising a top and side and end walls hingedly connected thereto, the side walls having diagonal scores at their ends providing hinged folding flaps, said folding flaps having corner members hingedly connected thereto and secured to the end walls, the cover end walls having locking extensions springably connected to their outer edges and disposed inwardly of the cover end walls and inclined relative thereto, said extensions having slots therein through which said tongues are inserted, the cover being of such length relative to the body member as to permit fingers being inserted between the ends of the cover and the body member to facilitate disengagement of the cover locking extensions from the tongues.

3. In a container, the combination with a tray-like body member adapted as a baking dish and having a bottom and side and end walls, the side and end walls extending upwardly and outwardly from the bottom, the end walls having projecting tapered dove-tailed tongues on their upper edges, and a cover comprising a top and side and end walls, the cover end walls having locking extensions springably connected to their outer edges and disposed inwardly of the cover end walls and inclined relative thereto, said extensions having slots therein through which said tongues are inserted, the lower edges of the slots being curved to facilitate the engagement of the tongues therewith when the cover is inverted over the body member, the said locking extensions being slit at the ends of their slots to receive the dove-tailed tongue projections, the cover being of such length relative to the body member as to permit fingers being inserted between the ends of the cover and the body member to facilitate disengagement of the cover locking extensions from the tongues.

4. In a container, the combination with a tray-like body member adapted as a baking dish and having a bottom and side and end walls, the side and end walls extending upwardly and outwardly from the bottom, the end walls having projecting dove-tailed tongues on their upper edges, and a cover comprising a top and side and end walls, the cover end walls having locking extensions springably connected to their outer edges and disposed inwardly of the cover end walls and inclined relative thereto, said extensions having slots therein through which said tongues are inserted, the cover being of such length relative to the body member as to permit fingers being inserted between the ends of the cover and the body member to facilitate disengagement of the cover locking extensions from the tongues.

5. In a container, the combination of a body member having a bottom and end walls inclined upwardly and outwardly from said bottom, said body member having side walls connected to said bottom and end walls, the end walls being provided with tapered dove-tailed tongues projecting upwardly from the upper edges of the end walls, and a cover comprising a top and side and end walls, the cover end walls having locking extensions springably connected to their outer edges and disposed inwardly of the cover end walls and inclined relative thereto, said extensions having slots therein through which said tongues are inserted, the lower edges of the slots being curved to facilitate the engagement of the tongues therewith when the cover is inverted over the body member, the said locking extensions being slit at the ends of their slots for passage of the dove-tailed tongue projections therethrough to the inner sides of the extensions.

6. In a container, the combination of a body member having a bottom and side and end walls, the end walls being provided with dove-tailed tongues projecting upwardly from the upper edges of the end walls, and a cover comprising a top and side and end walls, the cover end walls having locking extensions springably connected to their outer edges and disposed inwardly of the cover end walls and inclined relative thereto, said extensions having slots therein through which said tongues are inserted, the said locking extensions being slit at the ends of their slots for passage of the dove-tailed tongue projections therethrough to the inner sides of the extensions.

7. In a container, the combination of a body member having a bottom and opposed walls projecting upwardly from opposed edges of said bottom, and a cover comprising a top member and opposed walls projecting downwardly from opposed edges of said top member, said cover opposed walls having extensions springably connected to and projecting upwardly from the lower edges of the cover opposed walls on the inner sides thereof and inclined upwardly and inwardly relative thereto, said opposed body walls having tongues projecting upwardly from their upper edges, said inclined extensions having slots therein for receiving the upwardly projecting tongues therethrough, said tongues having portions adjacent the ends thereof and projecting from the side edges thereof engageable with the inner sides of the extensions for retaining the tongues in the slots of the extensions when the cover is closed over the body member.

References Cited in the file of this patent

UNITED STATES PATENTS

| Number | Name | Date |
|---|---|---|
| 2,370,927 | Anderson | Mar. 6, 1945 |
| 2,412,402 | Huye | Dec. 10, 1946 |
| 2,531,507 | Goodyear | Nov. 28, 1950 |
| 2,544,565 | Phillips | Mar. 6, 1951 |
| 2,559,320 | Rushing et al. | July 3, 1951 |

FOREIGN PATENTS

| Number | Country | Date |
|---|---|---|
| 101,670 | Australia | July 21, 1937 |